UNITED STATES PATENT OFFICE.

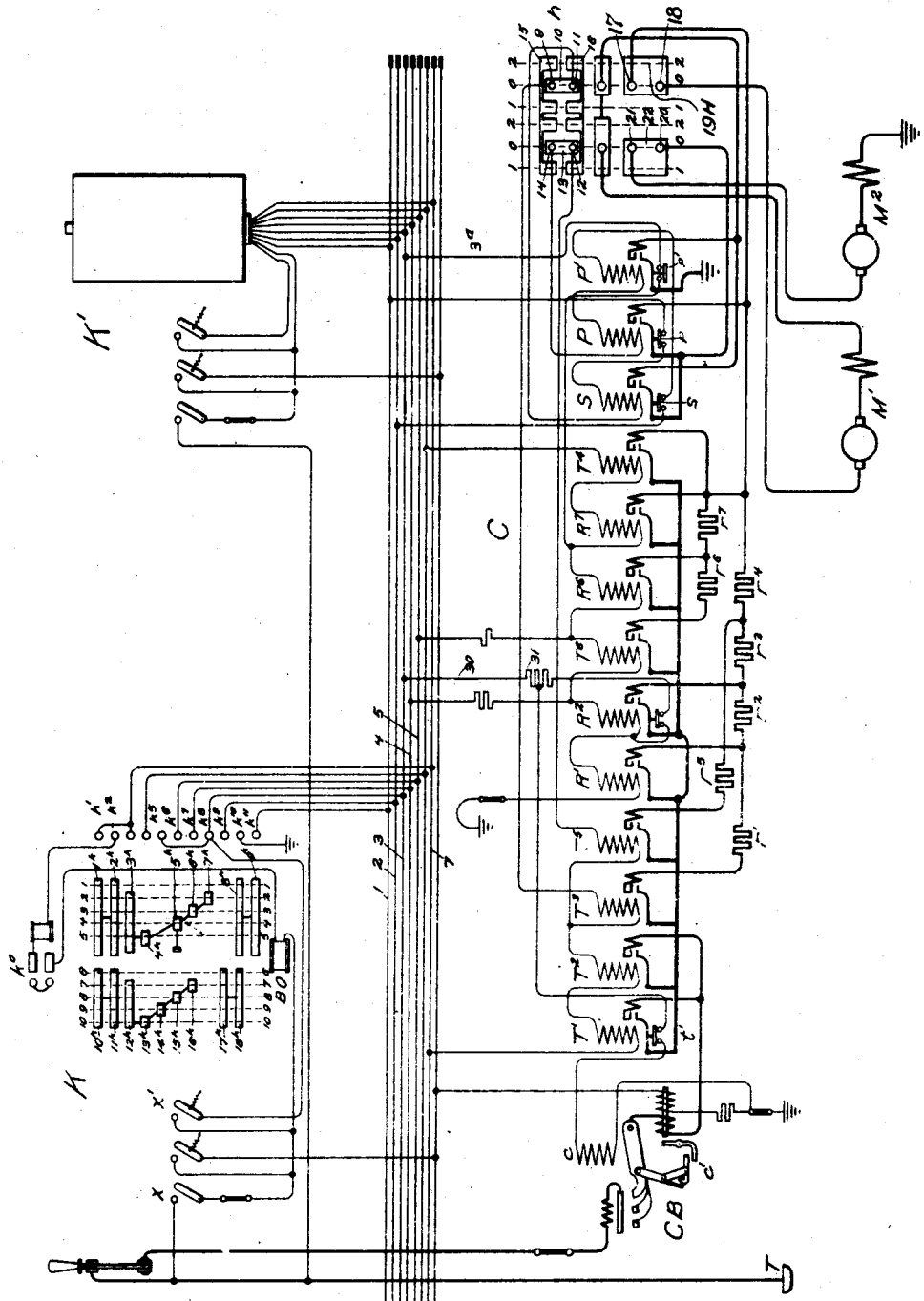

GEORGE H. HILL, OF SCHENECTADY, NEW YORK, ASSIGNOR TO GENERAL ELECTRIC COMPANY, A CORPORATION OF NEW YORK.

CONTROL SYSTEM.

No. 872,563.  Specification of Letters Patent.  Patented Dec. 3, 1907.

Application filed November 27, 1905. Serial No. 289,155.

*To all whom it may concern:*

Be it known that I, GEORGE H. HILL, a citizen of the United States, residing at Schenectady, county of Schenectady, State of New York, have invented certain new and useful Improvements in Control Systems, of which the following is a specification.

The present invention relates to systems of motor control and more particularly to systems arranged to control the operation of a plurality of motors or groups of motors. It frequently becomes necessary to cut one or more motors out of circuit and when this is done and the remaining motors are operated and controlled in the usual way from the master controller it is desirable that the most advantageous circuit conditions be secured with the altered system.

The object of the present invention is to provide means whereby when one or more motors of a system is eliminated from the circuit, the control system shall be changed so as to give the most advantageous operation of the remaining motors.

The present invention will be more fully understood from the following description thereof taken in connection with the accompanying drawing which shows diagrammatically the motor and control equipment for a railway car arranged in accordance with the present invention.

The system illustrated, except as modified in accordance with the present invention, is substantially the same as that shown in my Patent No. 801,238, granted Oct. 10, 1905; $M^1$ and $M^2$ representing two motors, C a motor controller of the separately actuated contact type, K and $K^1$ master controllers and C B a circuit breaker: the control apparatus being arranged to connect the motor to the source of current supply in series with each other and in series with a definite amount of resistance, to eliminate the resistance by a series of steps, to connect the motors in parallel to the source of current supply and with a different amount of resistance in circuit, and finally to eliminate this latter resistance by successive steps. It is of course understood that the form of control apparatus may be varied at will, the apparatus shown being, however, indicative of a preferred arrangement.

Either of the motors may be removed from the circuit by means of a cut-out switch H of any usual or preferred type. Associated with the main cut-out switch is an auxiliary switch $h$ arranged to change the control circuit, in a manner to be hereinafter described, when the cut-out switch is operated to remove either motor from the circuit. The controller C comprises a series of switches $T^1$ to $T^6$, inclusive, adapted to connect the motor circuit to trolley T when the circuit-breaker is closed, although the switches need not all be closed at the same time. S is a series switch, P and $P^1$ parallel switches, $R^1$, $R^2$, $R^6$ and $R^7$ resistance controlling switches, these latter switches determining the arrangement and proportion of the resistances $r^1$ and $r^4$ in the motor circuit.

Assuming the parts to be in the position shown: then, when it is desired to start the motors, the switch $x$ is closed and the switch $x^1$, upon being temporarily closed, allows current to flow from trolley T through switches $x$, $x^1$, through the fixed contact $k^9$ of the master controller, to train wire 3, through wire 30 and a portion of resistance 31, then through the interlock $t^1$ on the first line switch, thence through the actuating coil $c$ of the circuit breaker, to ground. The circuit breaker is now closed and is mechanically maintained closed through latch mechanism $c^1$. Upon moving the master controller K (illustrated as a developed cylinder carrying movable contacts adapted to engage with fixed fingers) so that the fixed contacts engage with movable contacts along line 1 1, current flows from trolley, through switch $x$, blow-out coil B O, switch $K^0$, contacts $k^2$, $2^k$, $1^k$, $k^1$, train wire 7, thence through the actuating-coils of the line switches $T^1$, $T^2$, $T^3$, through contacts 9, 10 and 11 of switch $h$, through the actuating coil of the series switch S, through the auxiliary contact $p$ on the parallel switch P, to train wire 1, and thence through master controller contacts $k^{11}$, $9^k$, $8^k$ and $k^{10}$, to ground. The motors are now connected in series between trolley and ground and in series with the resistance sections $r^1$, $r^2$, $r^3$ and $r^4$. On moving the master controller to its second position, the switch $R^1$ is closed, thereby short circuiting resistance $r^1$. In the third position of the master controller switch $R^2$ is closed, short circuiting resistance section $r^2$. In the fourth running position switch $T^6$ is closed, thereby connecting resistances $r^6$ and $r^7$ in parallel with resistances $r^3$ and $r^4$. In the fifth running position, switches $R^7$ and $T^4$, as well as switch $R^6$, are closed, thereby eliminating all the resistance and leaving the motors connected in series across the line. In the sixth position of the controller, the circuits of the resistance and series switches are opened and the current, after passing through the actuating coils of switches $T^1$ and $T^2$, no longer passes through the actuating coil of switch $T^3$ but follows a branch circuit through the actuating coil of switch $T^5$, thence through contacts 12, 13 and 14 of the switch $h$, through the actuating coils of switches P and $P^1$, through interlock $s$ on the series switch, thence to train wire 2 and through master controller contacts $k^9$, $17^k$, $18^k$, $k^{10}$, to ground. Current now flows from trolley through switches $T^1$, $T^2$ and $T^5$, through resistance sections $r^5$ and $r^4$, and thence through the two motors in parallel. It is seen, therefore, that the resistance in the motor circuit in the first parallel position differs from that in the first series position. In the second parallel position, namely, when the master controller is moved to position 7, switches $R^1$ and $R^2$ are closed and resistance section $r^3$ is thereby cut in parallel with resistance section $r^5$. In the eighth running position, switch $T^6$ is closed and resistances $r^6$ and $r^7$ are grouped in parallel with the resistance previously in circuit. In position 9 switch $R^6$ is closed, thereby eliminating resistance section $r^6$ from the circuit and thus again decreasing the total resistance. In the final position, switches $T^4$ and $R^7$ are closed and, since these two switches close shunts about all the resistances, the motors remain connected across the line in parallel with each other and with no external resistance in circuit. Since the operations heretofore described are those which take place ordinarily in an old form of controller, all the various circuits have not been traced in detail although they are clearly apparent on the drawing.

The normal operation of the controller is modified when a cut-out switch is operated to remove either motor from the circuit. The cut-out switch is shown as having three positions: one in which the fixed contacts on both of the switches H and $h$ engage with the movable contacts along lines $o$ $o$, as illustrated; and the other two positions, those in which the fixed contacts engage with the movable contacts along lines 1 1 and lines 2 2, respectively. In the first case, both motors are included in circuit, while in the second and third cases, motors $M^1$ and $M^2$, respectively, are removed from the circuit. Assuming that it is desired to cut out the motor $M^1$, the cut-out switch is moved to the right until the fixed contacts engage with the movable contacts along lines 1 1. It is evident that the circuit of motor $M^1$ is now interrupted at contacts 17, 18 and 19, so that when the master controller is in its series running positions the motor circuit, which under normal conditions passes through resistance sections $r^1$ to $r^4$ through contacts 17, 18 and 19 of the cut-out switch, remains interrupted and no current passes to either motor during any of the series running positions. It will be noticed, however, that the contacts 10 and 13 on the switch $h$ are moved out of engagement with the fixed contacts, and that contact 9, instead of being connected to contact 11, as before, is now connected to contact 14, and contact 11 to contact 12. Under normal conditions the control circuit, when the master controller is in its first running position passes through the actuating coils of line switches $T^1$, $T^2$ and $T^3$, thence to and through the auxiliary switch $h$, through the actuating coil of the series switch, train wire 1, and thence to ground. This circuit is now, however, interrupted at the switch $h$ so that the current is compelled to follow a branch circuit after leaving the actuating coil of switch $T^2$ and thence flows through the actuating coil of switch $T^5$, through contacts 12, 16, and 11 of switch $h$, and thence through the actuating coil of the series switch and to ground as before. Although this operation of controller produces no effect on the motors it will be noticed that the line switches closed during the first position of the master controller are those which are normally closed during the first parallel position, namely, position 6. In like manner, as will appear, the line switches which are closed in the first parallel position when one of the motors is cut out are those which under normal conditions are operated in the first series position of the controller.

Assuming that the master controller has reached its first parallel running position; current flows from trolley through the master controller to train wire 7, and thence through the actuating coils of switches $T^1$ $T^2$ and $T^3$ through contacts 9, 15, and 14 of switch $h$ to the actuating coils of the parallel switches P and $P^1$, through the interlock $s$ on the series switch, thence to train wire 2 and through the master controller, to ground, as previously described. The circuit for the motor $M^2$ is now as follows: from trolley through the circuit breaker, through the line switch $T^1$ to $T^3$, through resistances $r^1$, $r^2$, $r^3$ and $r^4$, through switch P, through contacts 20, 21, 22, of the cut-out switch, through the motor $M^2$, to ground. Thus the single motor remaining in circuit is protected by the usual resistance employed when the motors are connected in series although the controller is now in its parallel running position. In the second parallel position, current flows from trolley through the master controller, the contact $k^7$, thence to train wire 4 and through actuating coils of switches $R^1$ and $R^2$, thus cutting out resistance sections $r^1$ and $r^2$. In the third parallel position, current passes from trolley through the contacts of the master controller to contact $k^8$ and thence to train wire 5 and through the actuating coil of switch $T^4$, through the actuating coils of switch $R^1$ and $R^2$, to ground; resistances $r^1$ and $r^2$ are left in circuit, but are now arranged in parallel with resistances $r^3$ and $r^4$. In the next position of the controller, current flows from trolley through the contacts of the master controller, to the connected contacts $k^5$ and $k^6$, thence to train wire 3, through wire $3^a$, through interlocks $p^1$ connected with switch $P^1$, to the actuating coil of switch $R^6$, and thence through the actuating coils of switches $T^6$, $R^2$, $R^1$, to ground. The closing of the switch $R^6$ cuts out resistance section $r^6$. In the final position of the controller, switches $R^7$ and $T^4$ are closed in a manner previously described, thereby forming a shunt about all the resistance and leaving the motor connected across the line with no resistance in circuit. In the same way, if it is desired to eliminate motor $M^2$ from circuit, the cut-out switch is moved into the position wherein the fixed contacts engage with the movable contacts along lines 2 2, whereupon the series circuit will be interrupted at contacts 20, 21 and 22 of the cut-out switch which contacts also entirely open-circuit the motor $M^2$. The control circuits are modified just as in the position of the cut-out switch which eliminates motor $M^1$.

It is evident that by the present invention it is made possible to remove motors from a system without in any way rendering the mode of control of the remaining motor or motors disadvantageous or undesirable. Also where a number of separate equipments are connected together, as several motor cars of a train, the number of motors in operation on any car may be altered without affecting the motors on the remaining cars, although the local control circuits are so modified that the best results are obtained with the remaining portion of the motor system.

Although I have described at considerable length one form of control system modified in accordance with the present invention, it is of course understood that the details of construction and mode of operation of the control system enters into the present invention only to the extent indicated in the following claims.

What I claim as new and desire to secure by Letters Patent of the United States, is,—

1. In a system of control, a motor circuit, a motor controller comprising a plurality of individual switches for governing said motor circuit, a governing system arranged to operate said switches normally in a predetermined order, and means for modifying said system so as to change the order in which certain of said switches are actuated.

2. In a system of control, a plurality of motors, a switch for cutting one of said motors out of circuit, a motor controller comprising a plurality of individual switches, a controlling system arranged to normally operate said switches in a predetermined order, and means controlled by said cut-out switch for changing the order in which certain of said switches are operated.

3. In a system of motor control, a motor circuit, a motor controller of a separately-actuated switch type including speed controlling switches, a governing system for said motor controller arranged to normally operate said speed controlling switches in a definite order, and means for modifying said governing system to vary the order of operation of certain of said speed controlling switches.

4. In a system of control, a plurality of motors, a resistance, a series parallel motor controller of the separately-actuated switch type including switches adapted to vary the amount of resistance in the motor circuit, a master controller and connections constructed and arranged to operate one of said resistance switches in the series position of the master controller and another in the parallel position, and means for modifying the connections so as to reverse the order in which said latter switches are operated.

5. In a system of motor control, a plurality of motors, a resistance, a series parallel controller arranged to connect said motors in series with a portion of said resistance in circuit and in parallel with a different portion of said resistance in circuit, and means for reversing the order in which said portions of resistance are included in the motor circuit.

6. In a system of motor control, a plurality of motors, a cut-out switch for removing one of said motors from the circuit, a resistance, a series parallel controller arranged to connect said motors in series with a portion of said resistance in circuit and in parallel with a different portion of said resistance in circuit, and means controlled by said cut-out switch for reversing the order in which said portions of resistance are included in the motor circuit.

7. In a system of motor control, a plurality of motors, a cut-out switch for removing one of said motors from the circuit, a resistance, a series parallel motor controller of the separately-actuated switch type, including switches adapted to vary the amount of resistance in the motor circuit, a master controller and connections constructed and arranged to cause said motor controller to connect the motors in series with a portion of said resistance in circuit in the series position of the master controller, and to connect the motors in parallel with a different portion of said resistance in circuit in parallel position of the master controller, and means controlled by the cut-out switch for modifying the connections in order to reverse the order in which said portions of resistance are included in the motor circuit in the said positions of the master controller.

8. The combination with a vehicle equipment comprising a control system governed by a master controller, two electric motors and resistances therefor, of a selective controlling switch having a plurality of positions by which said control system may be so modified as to insure normal operation of both motors and the normal operation of either motor without the other when the master controller successively occupies a series of positions.

9. In a system of control, a plurality of translating devices, a plurality of individual switches for adjusting the circuits thereof, a master controller for actuating said switches, a switch for cutting one or more of said translating devices out of circuit, and means controlled by said cutting out switch for controlling the order in which the individual switches are actuated.

In witness whereof, I have hereunto set my hand this 25th day of November, 1905.

GEORGE H. HILL.

Witnesses:
BENJAMIN B. HULL,
HELEN ORFORD.